United States Patent [19]

Ulrich

[11] Patent Number: 4,670,736
[45] Date of Patent: Jun. 2, 1987

[54] ELECTRONIC CONTROL MEANS AND METHOD FOR CONTROLLING LIGHTS

[76] Inventor: Larry F. Ulrich, P.O. Box 289, Garden City, Kans. 67846

[21] Appl. No.: 731,987

[22] Filed: May 8, 1985

[51] Int. Cl.[4] .............................................. B60Q 1/46
[52] U.S. Cl. .................................. 340/81 R; 340/74; 340/67; 307/10 LS
[58] Field of Search .................... 340/81 R, 81 F, 74, 340/73, 67, 133; 307/10 LS

[56] References Cited

U.S. PATENT DOCUMENTS

| | | | |
|---|---|---|---|
| 4,006,453 | 2/1977 | Bryant | 340/67 |
| 4,037,195 | 7/1977 | Wojslawowicz | 340/81 F |
| 4,064,413 | 12/1977 | Andersen | 340/67 |
| 4,302,748 | 11/1981 | Gant | 340/67 |

Primary Examiner—Donnie L. Crosland
Attorney, Agent, or Firm—John Wade Carpenter

[57] ABSTRACT

An electronic control circuit has in combination, an operating circuitry board; and an emergency circuitry mounted on the operating circuitry board and in electrical communication with the battery and the emergency switch. The emergency switch when activated causes the emergency circuitry to send intermittent electrical power from the battery to the left and right front and rear lights causing the same to flash on and off intermittently. A right turn circuitry, a left turn circuitry, a brake circuitry, and a taillight are mounted on the operating circuitry board. A method for controlling lights include mounting the following circuits on an operating circuitry board: an emergency circuitry; a right turn circuitry; a left turn circuitry; a brake circuitry; and a taillight circuitry.

19 Claims, 3 Drawing Figures

ELECTRONIC CONTROL MEANS AND METHOD FOR CONTROLLING LIGHTS

BACKGROUND OF THE INVENTION

1. Field of the Invention

This invention is related to a method and electronic control circuit for controlling lights. More particularly, this invention provides an electronic control circuit and method for controlling lights in a motorcycle control system for motorcycle lights.

2. Description of the Prior Art

U.S. Pat. No. 3,909,661 to Grossenbacher discloses an electronic control for automobile lights. U.S. Pat. No. 3,621,329 by Frey teaches a combined system wherein the lights are multifunctional for both parking, boundary and taillights which may be energized when the system is in operation. U.S. Pat. No. 4,223,375 by Alpen discloses a headlight system for motorcycles. None of the foregoing prior art patents teach or suggest the particular electronic control circuit and the method for controlling lights of this invention.

SUMMARY OF THE INVENTION

This invention broadly accomplishes its desired objects by broadly providing an electronic control circuit in a control system for lights having a storage battery means with two terminals, one terminal being connected to ground. The control system further includes a left and right rear light, a left and right front light, a left turn switch means connected between the storage battery means and the left rear and left front lights, a right turn switch means attached between the storage battery means and the right rear and right front lights, an emergency switch means connected between the left and right front and rear lights and the storage battery, a taillight switch means and a brake light switch means each of which is connected between the storage battery means and the left and right rear lights. The electronic control circuit comprises in combination, an operating circuitry board; and an emergency circuitry means mounted on the operating circuitry board and in electrical communication with the battery means and the emergency switch means. The emergency switch means when activated causes the emergency circuitry means to send intermittent electrical power from the battery means to the left and right front and rear lights causing the same to flash on and off intermittently. A right turn circuitry means is mounted on the operating circuitry board and is in electrical communication with the battery means and the right turn switch means. The right turn switch means when activated causes the right turn circuitry means to send intermittent electrical power from the battery means to the right front and right rear lights. A left turn circuitry means is mounted on the operating circuitry board and is in electrical communication with the battery means and the left turn switch means. The left turn switch means when activated causes the left turn circuitry means to send intermittent electrical power from the battery means to the left front and left rear lights. A brake circuitry means is mounted on the operating circuitry board and is in electrical communication with the battery means and the brake light switch means. The brake light switch means when engaged causes the brake circuitry means to send electrical power from the battery means to the left and right rear lights. The electronic control circuit further comprises a taillight circuitry means mounted on the operating circuitry board and in electrical communication with the battery means and the taillight switch means. When the taillight switch means is closed it causes the taillight circuitry means to send electrical power from the battery means to the left and right rear lights. The invention further accomplishes its desired objects by providing a method for controlling lights in a controlled system for lights including a storage battery means having two terminals, one terminal being connected to ground, a left and right rear light, a left and right front light, a left turn switch means connected between the storage battery means and the left rear and left front lights, a right turn switch means attached between the storage battery means and the right rear front lights, an emergency switch means connected between the storage battery means and the left and right front and rear lights, a tail light switch means and a brake light switch means each of which is connected between the storage battery means and the left and right rear lights. The method comprises the steps of:

(a) mounting on an operating circuitry board an emergency circuitry means such as to be in electrical communication with said battery means and said emergency switch means, said emergency switch means when activated causes the emergency circuitry means to send intermittent electrical power from the battery means to the left and right front and rear lights causing the same to flash on and off intermittently;

(b) mounting on said operating circuitry board a right turn circuitry means such as to be in electrical communication with said battery means and said right turn switch means, said right turn switch means when activated causes the right turn circuitry means to send intermittent electrical power from the storage battery means to said right front and right rear lights;

(c) mounting on said operating circuitry board a left rurn circuitry means such as to be in electrical communication with said battery means and said left turn switch means, said left turn switch means when activated causes the left rurn circuitry means to send intermittent electrical power from the battery means to said front and left rear lights;

(d) mounting on said operating circuitry board a brake circuitry means, such as to be in electrical communication with said battery means and said brake light switch means, said brake light switch means when engaged causes the brake circuitry means to send electrical power from the battery means to said left and right rear lights; and (e) mounting on said operating circuitry board a taillight circuitry means such as to be in electrical communication with said battery means and said taillight switch means, said taillight switch means when closed causes the taillight circuitry means to send electrical power from the battery means to said left and right rear lights.

It is therefore an object of this invention to provide an electronic control circuit and a method for controlling lights in a controlled system for lights.

It is another object of this invention to provide an electronic control circuit and method for controlling motorcycle lights in a motorcycle control system.

Still further objects of the invention reside in a provision for an electronic control circuit and method for controlling motorcycle lights in a motorcycle control system that eliminates many of the wires and lights on a motorcycle.

These together with the various ancillary objects and features will become apparent as the following description proceeds, are attained by this invention, preferred embodiments being shown in the accompanying drawings, by way of example only, wherein:

DETAILED DESCRIPTION OF THE INVENTION

Figure 2:
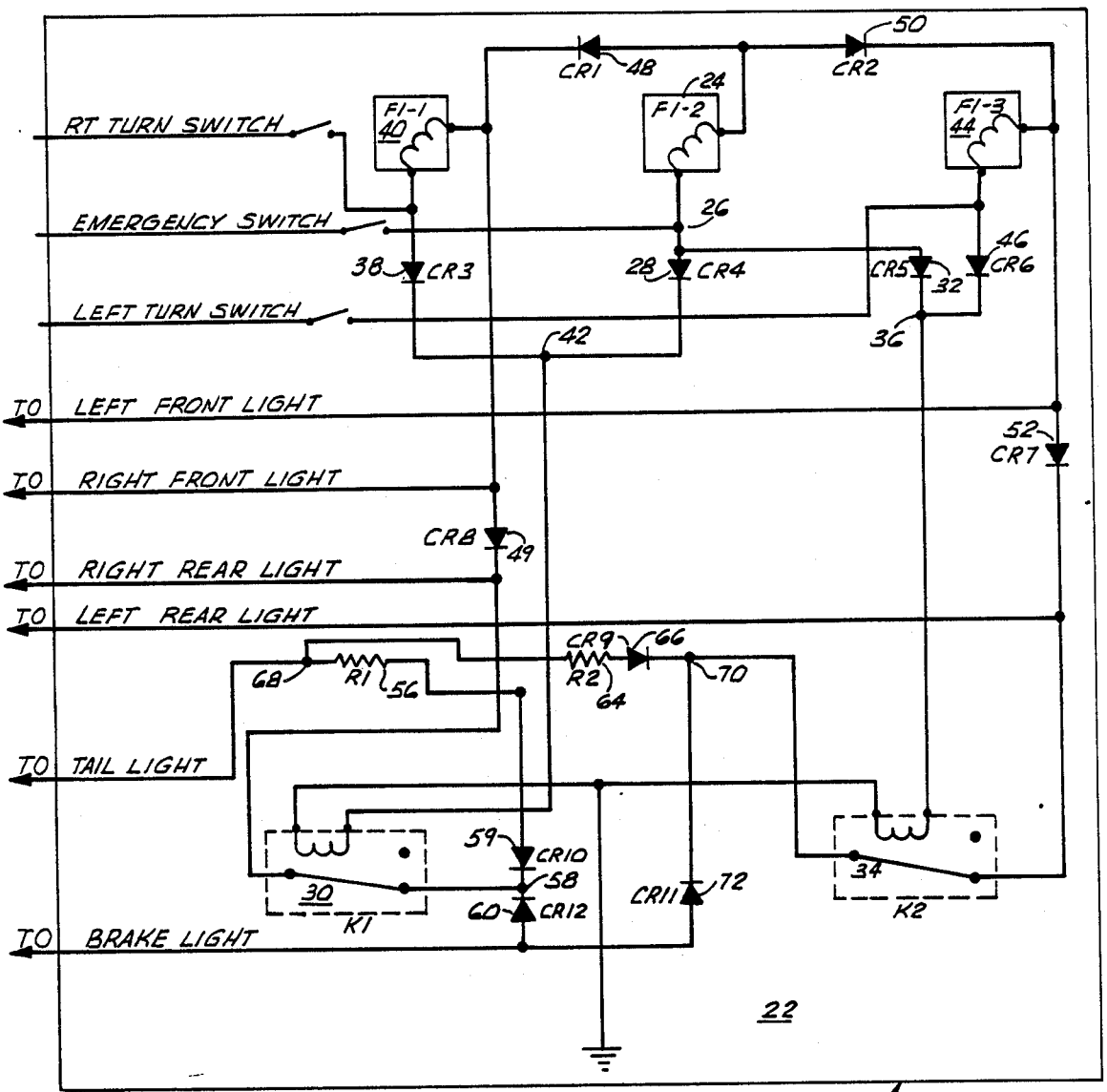
FIG. 2 is one preferred embodiment of the electronic circuitry diagram and components for this invention.
Figure 3:
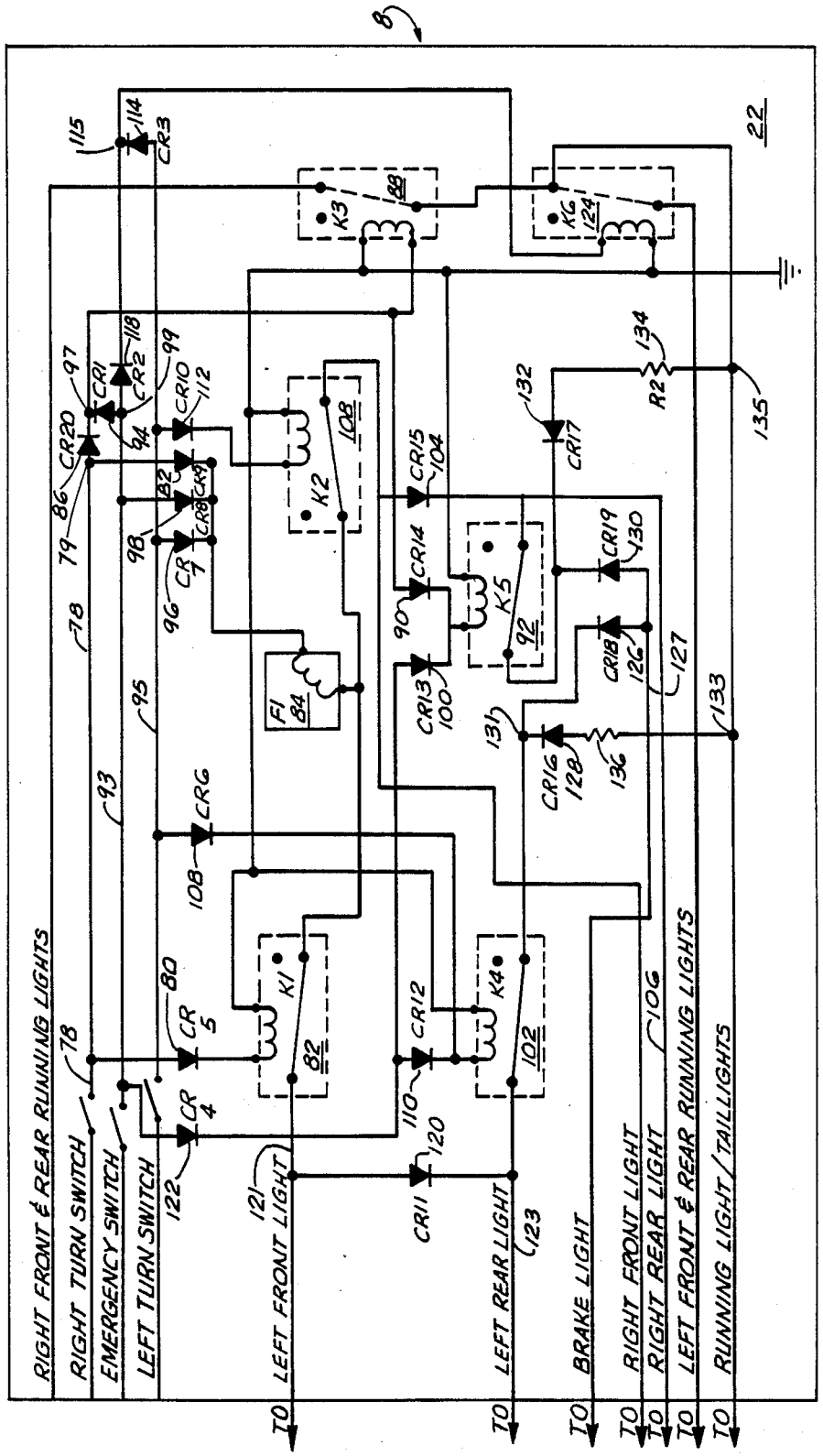
FIG. 3 is another preferred embodiment of the electronic circuitry diagram and components for this invention.

Referring in detail now to the drawings wherein similar parts of the invention are identified by like reference numerals, there is seen my electronic control system, generally illustrated as 8, which has two preferred embodiments respectively illustrated in FIGS. 2 and 3.

It should be initially understood that my electronic control system 8 may be utilized in any lighting system where it is desirable to eliminate many of the wires and lights without loosing any of the preexisting advantages and functionalities. Preferably, my electronic control system 8 is utilized in a preexisting motorcycle electronic control system for motorcycle lights. My system 8 ties into an existing motorcycle factory electronic control box, generally illustrated as 9 in FIG. 1, and controls and/or regulates on a motorcycle a left rear light 10, a right rear light 12, a left front light 14, and a right front light 16. In the preferred embodiment of FIG. 3, my electronic control system 8 also controls a plurality of motorcycle running lights which are not shown in the drawings because the number and position of the motorcycle running lights vary with the brand of motorcycle. In both preferred embodiments of my electronic control system 8, the left rear light 10 and the right rear light 12 function as brake lights, taillights, left and right turn lights, and emergency lights. Any existing brake lights, taillights turn lights and emergency lights may be eliminated on a motorcycle, along with the numerous wires associated therewith, and replaced with the left rear light 10 and the right rear light 12 and a single set of wires for same.

An existing motorcycle electronic control system would include an ignition switch 18, a storage battery 20 having two terminals with one of the two terminals grounded, a left and right turn switch, an emergency or hazardous switch, brake switch which is activated when the brakes are engaged, and a taillight switch which may also activate a head light and running lights. None of the switches are shown in the drawings as they are well known to artisans in the art.

Figure 1:
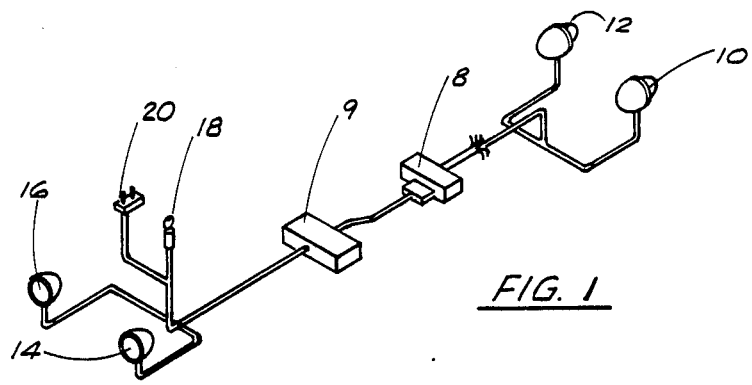
FIG. 1 is a perspective view of a pair of front lights and a pair of rear lights for a motorcycle with the electronic control system of this invention disposed between the existing factory electronic control box and the pair of rear taillights.

When my electronic control system 8 is electrically engaged with the electronic control box 9 and between the left rear light 10 and right rear light 12 as illustrated in FIG. 1, the left turn switch is electrically connected between the storage battery 20 and the left rear 10 and left front 14 lights, and the right turn switch is electrically attached between the storage battery 20 and the right rear 12 and right front 16 lights. The emergency switch is electrically connected between the storage battery 20 and the left front 14 and right front 16 lights and the left rear 10 and right rear 12 lights. The brake light switch and the taillight switch are each electrically engaged between the storage battery 20 and the left rear light 10 and the right rear light 12. In the embodiment of FIG. 3 where running lights exist, the running light switch (or the tail/running light switch where the taillight switch functions to activate both the taillights and the running lights) is electrically connected between the storage battery 20 and the running lights.

The preferred embodiment of my electronic control system 8 in FIG. 2 comprises an operating circuitry board 22. An emergency circuitry means is mounted on the operating circuitry board 22 and is in electrical communication with the battery 20 and the emergency switch means. When the emergency switch means is activated, it causes the emergency circuitry means to send intermittent electrical power from the battery 20 to the left 14, 10 and right 16, 12 front and rear lights, respectively, causing the same to flash on and off intermittently. A right turn circuitry means is mounted on the operating circuitry board 22 and is in electrical communication with the battery 20 and the right turn switch means. When the right turn switch means is activated, it causes the right turn circuitry means to send intermittent electrical power from the battery 20 to the right front 16 and right rear 12 lights. A left turn circuitry means is also mounted on the operating circuitry board 22 and is in electrical communication with the battery 20 and the left turn switch means. The left turn switch means when activated causes the left turn circuitry means to send intermittent electrical power from the battery 20 to said left front 14 and left rear 10 lights. A brake circuitry means is mounted on the operating circuitry board 22 and is in electrical communication with said battery 20 and the brake light switch means. The brake light switch means when engaged causes the brake circuitry means to send electrical power from the battery 20 to said left 10 and right 12 rear lights. The final circuitry of my invention in FIG. 2 is a taillight circuitry means. It is mounted on the operating circuitry board 22 and is in electrical communication with the battery 20 and the taillight switch means. When the taillight switch means is closed it causes the taillight circuitry means to send electrical power from the battery 20 to the left 10 and right 12 rear lights.

The electronic control circuitry means in FIG. 2 comprises a turn flasher 24 electrically connected to the emergency switch means at 26. A rectifier 28 is electrically engaged to the flasher 24, and a relay 30 electrically communicates with the rectifier 28 and the flasher 24. Rectifier 32 is electrically connected to the flasher 24, and another relay 34 is electrically attached to the rectifier 32 at 36. Rectifier 38 is electrically connected to a turn flasher 40 and is also in electrical communication with rectifier 28 at the juncture 42. A third and final flasher 44 is in electrical engagement with rectifier 32 via juncture 36 and a rectifier 46 which is electrically connected to flasher 44. Rectifiers 48 and 40 are electrically engaged to flasher 24, and rectifier 50 and 52 electrically communicates with flasher 24 as illustrated in FIG. 2. Relay 30 is electrically engaged to rectifier 54 and resistor 56 at juncture 58 to electrically communicate with the same. Rectifier 60 electrically interconnects between juncture 58 and a juncture 62 of the brake light circuit as illustrated in FIG. 2. Resistor 64 and rectifier 66 are attached electrically in series between a juncture 68 on the taillight circuit and a juncture 70 which is also the juncture of a rectifier 72 with juncture 62, as illustrated in FIG. 2.

The emergency circuitry in FIG. 2 comprises flasher 24; rectifiers 28, 32, 38, 48, 49, 50 and 52; and relays 30 and 34. In operation of the emergency circuitry, power is fed to flasher 24 through rectifier 28 to relay 30. Relay 30 cancels brake light power and taillight power to the right rear light 12. Power is also fed to flasher 24 through 32 to relay 34. Relay 34 cancels brake light power and taillight power to the left rear light 10. Rectifiers 38 and 32 respectively block emergency power from flashers 40 and 44. Flasher 24 sends intermittent power through rectifier 48 to the right front light 16 and through rectifier 49 to the right front light 16 and through rectifier 49 to the right rear light 12 and intermittent power through rectifier 50 to the left front light 14 and through rectifier 52 to the left rear light 10. This causes lights 10, 12, 14 and 16 to flash on and off intermittently.

The right turn circuit in FIG. 2 comprises flasher 40; rectifiers 28, 38, 48 and 49; and relay 30. In operation of the right turn circuitry, power is fed to flasher 40 and through rectifiers 38 to relay 30. Relay 30 cancels brake light power and taillight power to the right rear light 12. Rectifier 28 blocks power from the left turn circuitry and the emergency circuitry. Flasher 40 sends intermittent power to the right front light 16 and through rectifier 49 to the right rear light 12. Rectifier 48 blocks intermittent power from flashers 24 and 44. Rectifier 49 blocks power of the right rear light 12 circuit from entering the right front light 16 circuit.

The left turn circuit in FIG. 2 comprises flasher 44; rectifiers 32, 46, 50 and 52; and relay 34. In operation of the left turn circuit, power is fed to flasher 44 and through rectifier 46 to relay 34. Relay 34 cancels brake light power and taillight power to the left rear light 10. Rectifier 32 blocks power from the right turn circuitry and the emergency circuitry. Flasher 44 sends intermittent power to the left front light 14 and through rectifier 52 to the left rear light 10. Rectifier 50 blocks intermittent power from flashers 24 and 40. Rectifier 52 blocks power of the left rear light 10 circuit from entering the left front light 14 circuit.

The taillight circuit in FIG. 2 comprises resistors 56 and 64; rectifiers 49, 54, 60, 52; 66 and 72; and relays 30 and 34. In operation of the taillight circuit power is fed to resistor 56 through rectifier 54 to relay 30 for taillight power to right rear light 12. Rectifier 49 blocks taillight power from the right front light 16 circuit. Rectifier 60 blocks taillight power from the brake light circuitry. Power is also fed to resistor 64 through rectifier 66 to relay 34 for taillight power to the left rear light 10. Rectifier 52 blocks taillight power from the left front light 14 circuit. Rectifier 72 blocks taillight power to the brake light circuit.

The brake light circuit in FIG. 2 comprises rectifiers 60, 49, 54, 72, 52 and 66; and relays 30 and 34. In operation of the brake light circuitry, power is fed through rectifier 60 through relay 30 to the right rear light 12. Rectifier 49 blocks brake light power from the right front light 16 circuitry, and rectifier 54 blocks brake light power from the right taillight circuit. Power is also fed through rectifier 72 through relay 34 to the left rear light 10. Rectifier 52 blocks brake light power from the left front light 14 circuitry, and rectifier 66 blocks brake light power from the left taillight circuit. The brake light power overrides the resistors 56 and 64 for the taillight circuit to render a brighter braking light.

With respect to the preferred embodiment of my invention in FIG. 2, it should be understood that the various components may be of any value which would accomplish the function and method for controlling lights as intended herein. Preferably, all of the rectifiers (28, 38, 48, 50, 32, 46, 52, 49, 66, 54, 60, and 72) are each 50 volt, 3–300 amp surge rating (for ½ cycle) epoxy diodes; the resistors 56 and 64 are 5 watt, 1 ohm, wire wound resistors; the two relays 30 and 34 are 8 amp contact (12 volt coil, 70 ohms, 72 m A); and the three flashers 24, 40, and 44 are 12 volt heavy duty variable load-turn signal flashers.

The leads on FIG. 2 designated "RT Turn Switch", "Emergency Switch", "LT Turn Switch", "Tail Light" and "Brakelight" interconnect electrically via a harness (not shown in the drawings) to the existing motorcycle factory electronic control box 9 which would be readily known to artisans possessing ordinary skill. The harness would also have four electrical conductors interconnecting the leads on FIG. 2 designated "Left Front Light", "Right Front Light", "Right Rear Light" and "Left Rear Light" respectively to the left front light 14, the right front light 16, the right rear light 12 and the left rear light 10.

The rectifiers in FIG. 2 isolate the various circuits. Rectifiers 48 and 28 isolate the right turn from the emergency and the left turn circuit. Rectifiers 38 and 46 isolate the emergency circuit from flashers 40 and 44. Rectifiers 50 and 32 isolate the left turn from the right turn and emergency circuit. Rectifiers 52 and 49 respectively isolate the left front circuit from the left rear circuit and the right front circuit from the right rear circuit, respectively. Rectifiers 66 and 54 isolate from the taillight power circuit respectively the left turn and emergency circuit, and the right turn and emergency circuit, respectively. From the brake light power circuit, rectifiers 72 and 60 isolate respectively the left turn and emergency circuit, and the right turn and emergency circuit, respectively.

Resistor 56 controls the power supply for the right rear light 12, and resistor 64 controls the power supply for the left rear light 10.

Relay 30 isolates the right taillight and brake light from the right turn-emergency circuit. Relay 34 isolates the left taillight and brake light from the left turn-emergency circuit.

As was previously mentioned, flasher 40 is for the right turn circuit, flasher 24 is for the emergency circuit, and flasher 44 is for the left turn circuit.

The control circuit 8 for the preferred embodiment of FIG. 2 enables four functions to operate into a single element light bulb to the rear of any vehicle (i.e. preferably a motorcycle); and enables two functions to operate into a single element light bulb to the front of any vehicle (i.e. preferably a motorcycle). It should be understood that a double element light bulb may be utilized in this embodiment of the invention.

The flashers 40, 24 and 44 are very difficult to mount on the circuit board 22. In order to solve this problem, I have devised an advance design for the embodiment of FIG. 2 wherein flashers 40 and 44 have been replaced by a pair of relays on the circuit board 22. This advance design embodiment is illustrated in FIG. 3 and also includes right, left front and rear running light circuitry along with a running light taillight circuitry, in addition to an emergency circuitry, a right turn circuitry, a left turn circuitry and a brake circuitry. In the embodiment of the invention of FIG. 3, there may be a separate leftright running light switch connected between the storage battery means and the left, right front and rear running lights in order to illuminate the same. The running light/taillights include added running lights and have a tail/running light switch, which has been previously mentioned.

The preferred embodiment of my electronic control system 8 in FIG. 3 comprises the operating circuitry board 22. For the preferred embodiment of the invention in FIG. 3, an emergency circuitry means is mounted on the operating circuitry board 22 and is in electrical communication with the battery 20 and the emergency switch means. When the emergency switch means of FIG. 3 is activated, it causes the emergency circuitry means to send intermittent electrical power from the battery 20 to the left 14, 10 and right 16, 12 front and rear lights, respectively, causing the same to flash on and off intermittently. A right turn circuitry means is mounted on the operating circuitry board 22 and is in electrical communication with the battery 20 and the right turn switch means. When the right turn switch means of FIG. 3 is activated, it causes the right turn circuitry means to send intermittent electrical power from the battery 20 to the right front 16 and right rear 12 lights. A left turn circuitry means is also mounted on the operating circuitry board 22 and is in electrical communication with the battery 20 and the left turn switch means. The left turn switch means of FIG. 3 when activated causes the left turn circuitry means to send intermittent electrical power from the battery 20 to said left front 14 and left rear 10 lights. A brake circuitry means is mounted on the operating circuitry board 22 in FIG. 3 and is in electrical communication with said battery 20 and the brake light switch means. The brake light switch means in FIG. 3 when engaged causes the brake circuitry means to send electrical power from the battery 20 to said left 10 and right 12 rear lights. A right front and rear running light circuitry means and a left front and rear running light circuitry means are mounted on the operating circuitry board 22 of FIG. 3 and is in electrical communication with the battery 20 and a running light switch means. When the running light switch is closed it causes the right, left front and rear running lights circuitry means to send electrical power from the battery 20 to any right, left front and rear running lights that are on the motorcycle. The final circuitry of my invention in FIG. 3 is running light/taillight circuitry means. It is mounted on the operating circuitry board 22 and is in electrical communication with the battery 20 and the taillight switch means. When the taillight switch means is closed it causes the running light/taillight circuitry means to send electrical power from the battery 20 to the left 10 and right 12 rear lights and any additional running lights that are on the motorcycle in addition to the right, left front and rear running lights.

The electronic control circuitry of FIG. 3 comprises a conductor 78 to the right turn switch means. A rectifier 80 is interconnected between the conductor 78 and a relay 82. Rectifier 82 interconnects from conductor 78 a juncture 79 to a flasher 84. Rectifier 86 is interconnected between juncture 79 to a relay 88. It should be understood that rectifier 86 has to be ahead of rectifier 82 with respect to conductor 78 in order to limit the voltage to rectifier 82. Rectifier 90 is in electrical communication to and between rectifier 86 and a relay 92.

The electronic control circuitry of FIG. 3 additionally comprises an emergency switch conductor 93 and a left turn switch conductor 95. Rectifier 94 is interconnected between juncture 97 in conductors 78 and juncture 99 on conductor 93. Rectifier 96 connects between conductor 95 and the common conductor to rectifier 82, and rectifier 98 connects between the common conductor to rectifier 82 and the conductor 93. Rectifier 100 is electrically engaged to a relay 102. Rectifier 104 electrically engages to a right rear conductor 106 and is also in communication with a relay 108. A rectifier 108 interconnects between conductor 95 and relay 102. A rectifier 110 electrically connects to relay 92 via rectifiers 100. Rectifier 112 is interconnected between conductor 95 and relay 108. Rectifier 114 is on conductor 95 and connects to conductor 93 at juncture 115. Rectifier 118 is interconnected on conductor 93 between juncture 99 and juncture 115. As was seen for rectifier 86 that has to be ahead of rectifier 82 with respect to conductor 78 in order to limit the voltage to rectifier 82, rectifier 94 has to be in between rectifier 86 and rectifier 118 as illustrated in FIG. 3. Rectifier 120 interconnects a left front light conductor 121 with a left rear light conductor 123. Rectifier 122 is electrically engaged between the emergency switch conductor 93 and relay 102 via conductor 110. Relay 124 is electrically engaged to rectifier 118. Rectifier 126 connects to a brake light conductor 127 at juncture 129 and is also electrically connected to the relay 102. Rectifier 128 is in series with resistor 136 and interconnects at juncture 131 the conductor electrically engaging rectifier 126 with the relay 102 with the running light/taillight conductor at juncture 133. Rectifier 130 is attached electrically to relay 92 on the brake light circuitry, and rectifier 132 is connected in series with resistor 134 to the running light/taillight conductor at juncture 135.

The right turn circuitry in FIG. 3 comprises flasher 84; relays 82, 88, 92, and 108; and rectifiers 80, 82, 86, 90, 94, 96, 98, 100 and 104. In operation of the right turn circuitry, power is fed through rectifier 80 to relay 82 which cancels power to left circuit, and through rectifier 86 to relay 88 which cancels power to right and rear running lights. Power is also fed through rectifier 90 to relay 92 that cancels power to brake and taillights to rear. Rectifier 94 blocks right turn circuit from emergency circuit power, and rectifier 96 blocks right turn circuit from left turn circuit power. Rectifier 98 blocks right turn circuit from emergency circuit. Rectifier 100 blocks right turn circuit from relay 102 and the emergency circuit. Flasher 84 sends intermittent power through relay 108 to the right front light 16 and through rectifier 104 to the right rear light 12. Rectifier 104 blocks right rear circuit from right front circuit.

The left turn circuit in FIG. 3 comprises flasher 84, relays 102, 108, 124, and 82; and rectifiers 108, 110, 96, 112, 114, 118, 98, and 120. In operation of the left turn circuit, power is fed through rectifier 108 to relay 102 that cancels the brake and taillight power to the left rear. Rectifier 110 blocks the left circuit from the relay 92 and the emergency circuit. Power is also fed through rectifier 96 to flasher 84 and through rectifier 112 to relay 108 that cancels the right turn circuit. Power is also fed through rectifier 114 to relay 124 which cancels left front and rear running lights. Rectifier 118 blocks left turn circuit from the emergency circuit. Rectifier 98 blocks the left turn circuit from the emergency circuit, and rectifier 82 blocks the left turn circuit from the right turn circuit. Flasher 84 sends intermittent power through the relay 82 to the left front light 14, and through rectifier 120 to the left rear light 10. Rectifier 120 blocks the left rear circuit from the left front circuit.

The emergency circuit in FIG. 3 comprises flasher 84; relays 82, 108, 88, 102, 92 and 124; and rectifiers 122, 110, 100, 98, 96, 82, 104 118, 94, 86, 114, and 120. In operation of the emergency circuit in FIG. 3, power is fed through rectifier 122 and rectifier 110 to relay 102 which cancels brake and taillight power to the left rear. Power is also fed through rectifier 100 to relay 92 that cancels brake and taillights to right rear. Power is finally fed through rectifier 98 to the flasher 84. Rectifier 96 blocks the emergency circuit from the left circuit. Rectifier 82 blocks the emergency circuit from the right turn circuit, and through rectifier 118 to relay 124 which cancels left front and rear running lights; and through rectifier 94 to relay 88 that cancels right front and rear running lights. Rectifier 86 blocks emergency circuit from the right turn circuit, and rectifier 114 blocks the emergency circuit from the left turn circuit. Flasher 84 send intermittent power through relay 82 to the left front light 14 circuit and through rectifier 120 to the left rear light 10 circuit, and through relay 108 to the right front light 16 circuit, and through rectifier 104 to the right rear light 12.

The brake light circuitry in FIG. 3 comprises relays 102 and 92; and the rectifiers 126, 128, 120, 130, 132 and 104. In operation of the brake light circuity in FIG. 3, power is fed through rectifier 126 and relay 102 to the left rear light 10. Rectifier 128 blocks the brake circuit from the running light/taillight circuit. Rectifier 120 blocks the brake circuit from entering the left front circuit. Power is also fed through rectifier 130 and relay 92 to the right rear light 12. Rectifier 132 blocks the brake circuit from the taillight circuit, and rectifier 104 blocks the brake circuit from entering the right front circuit.

The running light/taillight circuitry comprises resistors 136 and 134; and relays 102 and 92: rectifiers 128, 126, 120, 132, 130, and 104. In operation of the running light/taillight circuit, power is fed through resistor 136 and rectifier 128 and through relay 102 to the left rear light 10. Rectifier 126 blocks the running light/taillight circuit from the brake circuit, and rectifier 120 blocks the running light/taillight circuit power from entering the left front circuit. Power is also fed through resistor 134, through rectifier 132, through relay 92 to the right rear light 12. Rectifier 130 blocks the running light/taillight circuit from the brake circuit, and rectifier 104 blocks the running light/taillight circuit from entering the right front circuit.

The right, left front and rear running light circuitry in FIG. 3 comprises relays 124 and 88. In operation of the left, right front and rear running light circuit, power is fed through relay 124 to the left front and rear running lights, and through relay 88 to the right front and rear running lights. Relays 88 and 124 are controlled by the left turn, right turn and emergency circuits.

With respect to the preferred embodiment of my invention in FIG. 3 it should be understood that the various components may be of any value which would accomodate the function and method for controlling lights as intended in this preferred embodiment. Preferably, each of the rectifiers in this embodiment are 50 volt, 3–300 amp. surge rating (for ½ cycle) epoxy rectifier diodes. The resistors 134 and 136 are 5 watt, 1 ohm plus or minus 5%, wire wound resistors: the six relays are 8 amp contact (12 volt coil, 70 ohms, 72 mA), and the flasher 84 is 12 volt heavy duty variable load turn signal flasher.

The lights on FIG. 3 designated "Right Front and Rear Running Lights", "Right Turn Switch", "Emergency Switch", "Left Turn Switch", "Brake Light", "Left Front and Rear Running Lights", and "Running Light/Taillights" are interconnected electrically via a harness (not shown in the drawings) to the existing motorcycle factory electronic control box 9 which, as was previously mentioned, would be readily known to artisans possessing ordinary skill. As was the case for the preferred embodiment of FIG. 2, the harness for the preferred embodiment of FIG. 3 would also have four electronic conductors interconnecting the leads on FIG. 3 designated "Left Front Light", "Left Rear Light", "Right Front Light", "Right Rear Light", respectively to the left front light 14, the left rear light 10, the right front light 16 and the right rear light 12.

As was the situation in FIG. 2, the rectifiers in FIG. 3 isolate the various circuits. Rectifiers 94 and 100 isolate the right turn circuit from the emergency circuit. Rectifiers 118, 114, 108 and 110 isolate the left turn circuit from the emergency circuit. Rectifiers 122, 80 and 112 are used as safety blocks. Rectifier 96 isolates the left turn circuit from the emergency and right turn circuits. Rectifier 98 isolates the emergency circuit from the left and right turn circuits. Rectifier 82 isolates the right turn circuit from the emergency and left turn circuits. Rectifier 120 isolates the left front and left rear circuits. Rectifiers 90 and 86 isolate the emergency circuit from the right turn circuits. Rectifier 104 isolates the right front circuit and the right rear circuits. Rectifiers 128 and 132 isolate all circuits from the running light power supply, whereas rectifiers 126 and 130 isolate all circuits from the brake light power supply. Rectifiers 118 and 114 allow the emergency circuit and the left turn circuit to control the left front and rear running light circuit, whereas rectifiers 94 and 86 allow the emergency circuit and the right turn circuit to control the right front and rear running light circuit.

Resistors 134 and 136 respectively control the power supply for the right rear light 12 and the left rear light 10 for the running light/taillight circuit, respectively.

The flasher 84 controls the emergency circuit, the right turn and the left turn circuits.

Relay 82 is controlled by the right turn circuit when in use, and isolates the right turn circuit from the left turn circuit when the right turn circuit is in use. Relay 108 is controlled by the left turn circuit when in use, and isolates the left turn circuit from the right turn circuit when the left turn circuit is in use. Relay 88 is controlled by the right turn circuit and the emergency circuits, and is used to cancel the right front and rear running lights when the right turn and emergency circuits are used. Relay 102 is controlled by the left turn circuit and the emergency circuit and cancels the brake light and running light/taillight when the left turn circuit and the emergency circuit are used. Relay 92 is controlled by the right turn circuit and the emergency circuit and cancels the brake light and the running light/taillight circuit when the right turn circuit and the emergency circuit are used. The left relay employed in this embodiment of the invention is relay 124 which is controlled by the left turn circuit and the emergency circuits, and is utilized to cancel the left front and running left front circuit and running light/taillight circuit when the right turn circuit and the emergency circuit are used.

The controlled circuit 8 for the preferred embodiment of FIG. 3 also enables four functions to operate into a single element light bulb to the rear of any vehicle (i.e. preferably a motorcycle), and enables two functions to operate into a single element light bulb to the front of any vehicle (i.e. preferably a motorcycle). In this preferred embodiment of the invention, the controlled circuit 8 includes a controlled left, right front and rear running light circuit that is controlled by the right turn circuit, the left turn circuit, and the emergency circuit when in use. It should be understood for this embodiment of the invention that a double or dual element light bulb may be utilized.

While the present invention has been described herein with reference to particular embodiments thereof, a latitude of modification, various changes, and substitutions are intended in the foregoing disclosure, and it will be appreciated that in some instances some features of the invention will be employed without a corresponding use of other features without departing from the scope of the invention as set forth.

I claim:

1. In a control system for lights including a storage battery means having two terminals, one terminal being connected to ground, a left and right rear light, a left and right front light, a left turn switch means connected between the storage battery means and the left rear and left front lights, a right turn switch means attached between the storage battery means and the right rear and right front lights, an emergency switch means connected between the storage battery means and the left and right front and rear lights, a taillight switch means and a brake light switch means each of which is connected between the storage battery means and the left and right rear lights, an electronic control circuit comprising in combination, an operating circuitry board;

an emergency circuitry means mounted on said operating circuitry board and in electrical communication with said battery means and said emergency swith means, said emergency switch means when activated causes the emergency circuitry means to send intermittent electrical power from the battery means to the left and right front and rear lights causing the same to flash on and off intermittently;

a right turn circuitry means mounted on said operating circuitry board and in electrical communication with said battery means and said right turn switch means, said right turn switch means when activated causes the right turn circuitry means to send intermittent electrical power from the battery means to said right front and right rear lights;

a left turn circuitry means mounted on said operating circuitry board and in electrical communication with said battery means and said left turn switch means, said left turn switch means when activated causes the left turn circuitry means to send intermittent electrical power from the battery means to said left front and left rear lights;

a brake circuitry means mounted on said operating circuitry board and in electrical communication with said battery means and said brake light switch means, said brake light switch means when engaged causes the brake circuitry means to send electrical power from the battery means to said left and right rear lights; and a taillight circuitry means mounted on said operating circuitry board and in electrical communication with said battery means and said taillight switch means, said taillight switch means when closed causes the taillight circuitry means to send electrical power from the battery means to said left and right rear lights; and wherein said emergency circuitry means comprises a first turn signal flasher means electrically communicating with the emergency switch means;

a first rectifier means electrically engaged to said first turn signal flasher means;

a first relay means electrically communicating with first rectifier means and said first turn signal flasher means;

a second rectifier means electrically connected to said first flasher means;

a second relay means electrically attached to said second retifier means;

a third rectifier means electrically engaged to said first rectifier means;

a fourth and a fifth rectifier means electrically attached in series to said first turn signal flasher means;

and a sixth and a seventh rectifier means electrically connected in series to said first turn signal flasher means.

2. The control circuit of claim 1 wherein said right turn circuitry means comprises a second flasher means electrically communicating with said third rectifier means and said first relay means;

said first rectifier means for blocking power to the left turn circuit and to the emergency circuit;

said fourth and said fifth rectifier means:

and said second flasher means send intermittent power to the right front light and through said fifth rectifier to the right rear light.

3. The control circuit of claim 2 wherein said left turn circuitry means comprises a third flasher means electrically communicating with an eighth rectifier means to said second relay means;

said second rectifier means:

said sixth rectifier means;

said seventh rectifier means;

and said third flasher means sends intermittent power to the left front light and through said seventh rectifier to the left rear light.

4. The control circuit of claim 3 wherein said taillight circuitry means comprises a first resistor means connected in series with a ninth rectifier means, said ninth rectifier means electrically communicating with said first relay means;

said fifth rectifier means:

a tenth rectifier means electrically engaged between the first relay means and said ninth rectifier means and to a juncture on said brake light circuit to block taillight power from the brake light circuit;

a second resistor means electrically connected in series to an eleventh rectifier means which is electrically connected to said second relay means:

and a twelfth rectifier connected between said juncture where said tenth rectifier connects and to a point between said eleventh rectifier means and said second relay means.

5. The control circuit of claim 4 wherein said brake light circuitry comprises said tenth rectifier in electrical communication with said first relay means;

said fifth rectifier means;

said twelfth rectifier means in electrical communication with said second relay means;

and said seventh rectifier means and said eleventh rectifier means.

6. The control circuit of claim 5 additinally comprising a right rear conductor electrically engaged to said right rear light wherethrough brake light signals, taillight signals, and emergency light signals for the right rear light are conducted along with right turn signals;

and a left rear conductor electrically engaged to said left rear light wherethrough brake light signals, taillight signals, and emergency light signals for the left rear light are conducted along with left turn signals.

7. The control circuit of claim 6 additionally comprising a right turn switch conductor, an emergency switch conductor, a left turn switch conductor, a brake light conductor, and a taillight conductor, all electrically engaged respectively with said right turn switch means, emergency switch means, left turn switch means, brake light switch means, and taillight switch means.

8. The control circuit of claim 7 additionally comprising a right front conductor electrically engaged to said right front light and a left front conductor.

9. In a control system for lights including a storage battery means having two terminals, one terminal being connected to ground, a left and right rear light, a left and right front light, right front and rear running lights, left front and rear running lights, a left turn switch means connected between the storage battery means and the left rear and left front lights, a right turn switch means attached between the storage battery means and the right rear and right front lights, an emergency switch means connected between the storage battery means and the left and right front and rear lights, a running light switch means attached between the storage battery means and the right, left front and rear running lights, a taillight switch means and a brake light switch means each of which is connected between the storage battery means and the left and right rear lights, an electronic control circuit comprising in combination, an operating circuitry board;

an emergency circuitry means mounted on said operating circuitry board and in electrical communication with said battery means and said emergency switch means, said emergency switch means when activated causes the emergency circuitry means to send intermittent electrical power from the battery means to the left and right front and rear lights causing the same to flash on and off intermittently;

a right turn circuitry means mounted on said operating circuitry board and in electrical communication with said battery means and said right turn switch means, said right turn switch means when activated causes the right turn circuitry means to send intermittent electrical power from the battery means to said right front and right rear lights;

a left turn circuitry means mounted on said operating circuitry board and in electrical communication with said battery means and said left turn switch means, said left turn switch means when activated causes the left turn circuitry means to send intermittent electrical power from the battery means to said left front and left rear lights;

a brake circuitry means mounted on said operating circuitry board and in electrical communication with said battery means and said brake light switch means, said brake light switch means when engaged causes the brake circuitry means to send electrical power from the battery means to said left and right rear lights:

a right front and rear running light circuitry means mounted on said operating circuitry board and in electrical communication with said battery means and said running light switch means, said running light switch means when engaged causes the right front and rear running light circuitry means to send electrical power from the battery means to said right front and rear running lights;

a left front and rear running light circuitry means mounted on said operating circuitry board and in electrical communication with said battery means and said running light switch means, said running light switch means when engaged causes the left front and rear running light circuitry means to send electrical power from the battery means to said left front and rear running lights; and a running light/taillight circuitry means mounted on said operating circuitry board and in electrical communication with said battery means and said taillight switch means, said taillight switch means when closed causes the taillight circuitry means to send electrical power from the battery means to said left and right rear lights and any additional running lights that are in the control system for lights in addition to the right, left front and rear running lights.

10. The control circuit of claim 9 wherein said right turn circuitry means comprises a first flasher means electrically communicating with a first relay means which is in electrical communication with said right front light, and with a first rectifier means which is in electrical communication with said right rear light, a second rectifier means electrically engaged to said first flasher means, a third rectifier means electrically engaged to a second relay means, a fourth rectifier means electrically engaged to a third relay means, a fifth rectifier means electrically engaged between a fourth relay means and said second relay means, a sixth rectifier means for blocking the right turn circuitry from the emergency circuit, a seventh rectifier means for blocking the right turn circuitry, an eighth rectifier means for blocking the right turn circuitry from the emergency circuitry, and a ninth rectifier means electrically communicating with a fifth relay means to block the right turn circuit from the fifth relay means and the emergency circuit; and said left turn circuit means includes a thirteenth rectifier means electrically engaged to said third relay means, a sixteenth rectifier means electrically communicating with said fifth relay means for blocking the left turn circuit means from the fourth circuit means from the fourth relay means, said seventh rectifier means electrically communicating with said first flasher means, a fourteenth rectifier means electrically engaged to said first relay means, an eleventh rectifier means electrically communicating with a sixth relay means, a tenth rectifier means, said eighth rectifier means and said second rectifier means, said first flasher means electrically communicating with said third relay means and with a fifteenth rectifier means; and said emergency power circuit comprises a twelfth rectifier means electrically engaged to said sixteenth rectifier means and to said fifth relay means, said ninth rectifier means electrically engaged to said fourth relay means, said eighth rectifier means electrically communicating with said first flasher means, said seventh and said second rectifier means, said tenth rectifier communicating with said sixth relay means, said sixth rectifier means electrically engaged to said second relay means, said third rectifier means and said eleventh rectifier means, said first flasher means electrically engaged to said third relay means which is electrically connected to said fifteenth relay means, and said first flasher means is electrically engaged to said first relay means which is electrically connected to said first rectifier means; and said brake light circuitry means comprises a nineteenth rectifier means electrically communicating with said fifth relay means, a seventeenth rectifier means and said fifteenth rectifier means, a twentieth rectifier means electrically engaged to said fourth relay means, and an eighteenth rectifier means and said first rectifier means; and said running light/taillight circuitry means comprises a first resistor means in series with said seventeenth rectifier means and electrically communicating with said fifth relay means, said nineteenth rectifier means and said fifteenth rectifier means, a second resistor means in series with said eighteenth rectifier means and electrically communicating with said fourth relay means, said twentieth rectifier means and said first rectifier means; and said left front and rear running light circuitry means comprises said sixth relay means; and said right front and rear running light circuitry means comprises said second relay means.

11. A method for controlling lights in a controlled system for lights including a storage battery means having two terminals, one terminal being connected to ground, a left and right rear light, a left and right front light, a left turn switch means connected between the storage battery means the the left rear and left front lights, a right turn switch means attached between the storage battery means and the right rear and right front lights, an emergency switch means connected between the storage battery means and the left and right front and rear lights, a taillight switch means and a brake light switch means each of which is connected between the storage battery means and the left and right rear lights, the method comprising the steps of:
  (a) mounting on an operating circuitry board an emergency circuitry means such as to be in electrical communication with said battery means and said emergency switch means, said emergency switch means when activated causes the emergency circuitry means to send intermittent electrical power from the battery means to the left and right front and rear lights causing the same to flash on and off intermittently;
  (b) mounting on said operating circuitry board a right turn circuitry means such as to be in electrical communication with said battery means and said right turn switch means, said right turn switch means when activated causes the right turn circuitry means to send intermittent electrical power from the storage battery means to said right front and right rear lights:
  (c) mounting on said operating circuitry board a left turn circuitry means such as to be in electrical communication with said battery means and said left turn switch means, said left turn switch means when activated causes the left turn circuitry means to send intermittent electrical power from the battery means to said left front and left rear lights;
  (d) mounting on said operating circuitry board a brake circuitry means such as to be in electrical communication with said battery means and said brake light switch means, said brake light switch means when engaged causes the brake circuitry means to send electrical power from the battery means to said left and right rear lights; and
  (e) mounting on said operating circuitry board a taillight circuitry means such as to be in electrical communication with said battery means and said taillight switch means, said taillight switch means when closed causes the taillight circuitry means to send electrical power from the battery means to said left and right rear lights.

12. The method of claim 11 additionally comprising:
(1) cancelling power to the brake and taillights of the right rear;
(2) cancelling power to the brake and taillights of the left rear;
(3) blocking power from a second flasher means;
(4) blocking power from a third flasher means; and
(5) sending intermittent power with a first flasher means through a first and a second rectifier means to the right rear light and through a third and a fourth rectifier means to the left rear light.

13. The method of claim 12 additionally comprising:
(1) cancelling brake light power and taillight power to the pair of rear lights;
(2) blocking power from the left turn circuit and from the emergency circuit:
(3) blocking intermittent power from a second and a third flasher means:
(4) blocking power to the right rear light circuit from entering the right front light circuit; and
(5) sending intermittent power with a first flasher means to the right front light and through a first rectifier means to the right rear light.

14. The method of claim 13 additionally comprising:
(1) cancelling brake light power and taillight power to the left rear light;
(2) blocking power from the right turn circuit and from the emergency circuit:
(3) blocking intermittent power from a second and third flasher means;
(4) blocking power to the left rear light circuit from entering the left front light circuit; and
(5) sending intermittent power with a first flasher means to the left front light and through a first rectifier means to the left rear light.

15. The method of claim 14 additionally comprising:
(1) blocking taillight power from the left and right front lights:
(2) blocking taillight power to and from the brake light circuit;
(3) feeding power through a first resistor means, through a first rectifier means to a first relay means for taillight power to the right rear light; and
(4) feeding power through a second resistor means, through a second rectifier means for taillight power to the left rear light.

16. The method of claim 15 additionally comprising:
(1) blocking brake light power from the left and right front lights;
(2) blocking brake light power from the right and left taillight circuit;
(3) feeding power through a first rectifier means through a first relay means to the right rear light; and
(4) feeding power through a second rectifier means through a second relay means to the left rear light.

17. The method of claim 11 additionally comprising mounting a left front and rear running light circuitry means on said operating ci.cuitry board such as to be in electrical communication with said battery means and a running light switch means.

18. The method of claim 17 additionally comprising mounting a right front and rear running light circuitry means on said operating circuitry board such as to be in electrical communication with said battery means and said running light switch means.

19. In a control system for lights including a storage battery means having two terminals, one terminal being connected to ground, a left and right rear light, a left and right front light, a left turn switch means connected between the storage battery means and the left rear and left front lights, a right turn switch means attached between the storage battery means and the right rear and right front lights, an emergency switch means connected between the storge battery means and the left and right front and rear lights, a taillight switch means and a brake light switch means each of which is connected between the storage battery means and the left and right rear lights, an electronic control circuit comprising in combination, an operating circuitry board;

an emergency circuitry means mounted on said operating circuitry board and in electrical communication with said battery means and said emergency switch means, said emergency switch means when activated causes the emergency circuitry means to send intermittent electrical power from the battery means to the left and right front and rear lights causing the same to flash on and off intermittently;

a right turn circuitry means mounted on said operating circuitry board and in electrical communication with said battery means and said right turn switch means, said right turn switch means when activted causes the right turn circuitry means to send intermittent electrical power from the battery means to said right front and right rear lights;

a left turn circuitry means mounted on said operating circuitry board and in electrical communication with said battery means and said left turn switch means, said left turn switch means when activated causes the left turn circuitry means to send intermittent electrical power from the battery means to said left front and left rear lights;

a brake circuitry means mounted on said operating circuitry board and in electrical communication with said battery means and said brake light switch means, said brake light switch means when engaged causes the brake circuitry means to send electrical power from the battery means to said left and right rear lights; and a taillight circuitry means mounted on said operating circuitry board and in electrical communication with said battery means and said taillight switch means, said taillight switch means when closed causes the taillight circuitry means to send electrical power from the battery means to said left and right rear lights.

* * * * *